United States Patent [19]
Penry et al.

[11] Patent Number: 6,100,732
[45] Date of Patent: Aug. 8, 2000

[54] PHASE ENABLE AND CLOCK GENERATION CIRCUIT

[75] Inventors: David A. Penry, Sunnyvale; Kevin B. Normoyle, Santa Clara, both of Calif.

[73] Assignee: Sun Microsystems, Inc., Palo Alto, Calif.

[21] Appl. No.: 08/879,559

[22] Filed: Jun. 20, 1997

[51] Int. Cl.[7] .................................................. H04L 7/00
[52] U.S. Cl. .............................. 327/144; 327/99; 327/164
[58] Field of Search ..................................... 327/144, 145, 327/99, 296, 141, 291, 164

[56] References Cited

U.S. PATENT DOCUMENTS

| 5,475,324 | 12/1995 | Tomiyori | 327/99 |
| 5,654,988 | 8/1997 | Heyward et al. | 327/144 |
| 5,760,609 | 6/1998 | Sharpe-Geisler | 327/164 |

*Primary Examiner*—Dinh T. Le
*Attorney, Agent, or Firm*—Gunnison, McKay & Hodgson LLP; Forrest Gunnison

[57] ABSTRACT

A phase-enable circuit clocks a first functional unit at a first frequency and a second functional unit at a second frequency. Each of the first and second functional units is provided with a first clock signal of the first frequency. A phase-enable generator then uses the first clock signal and a second clock signal of a second frequency lower than the first frequency to develop a phase-enable signal that periodically disables a clock input terminal of the second functional unit so that the second functional unit is clocked at the second frequency. Changing the frequency of the second clock to zero switches the phase-enable circuit into another mode of operation. In that mode, the clock input terminal of the second functional unit is constantly enabled and the first and second functional units are each clocked at the first frequency.

18 Claims, 7 Drawing Sheets

PHASE ENABLE AND CLOCK GENERATION CIRCUIT

BACKGROUND

1. Field of the Invention

The present invention relates in general to timing circuits, and more particularly to the use of a clock signal in combination with a phase-enable signal to provide multiple clock rates.

2. Description of Related Art

Electronic circuits often include discrete entities (functional units) that must be clocked at different rates. This is typically accomplished by providing a clock signal of a particular frequency and some conventional logic to divide the clock signal into one or more additional clock signals of varying rates.

Figure 1A:
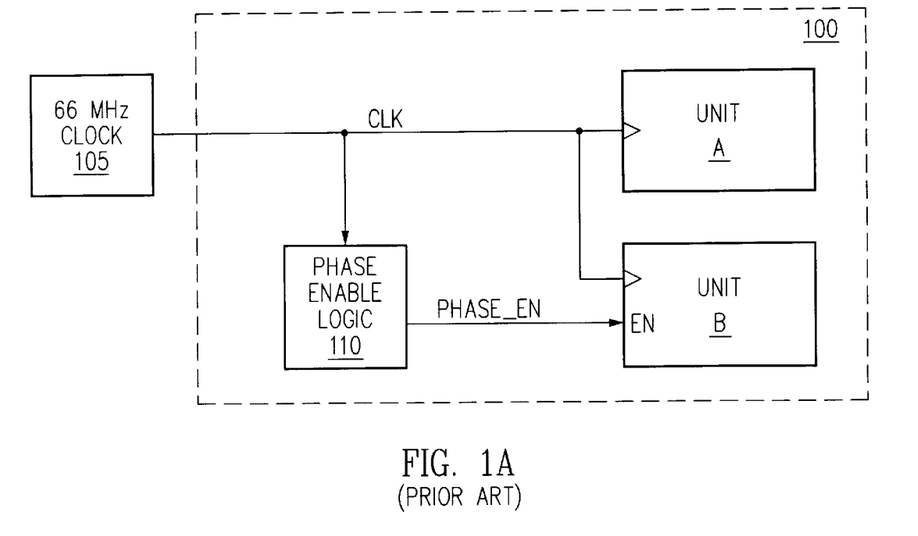
FIG. 1A illustrates a circuit 100 that makes use of a phase-enable signal to provide different clock rates to a functional unit A and a functional unit B.
Figure 1B:
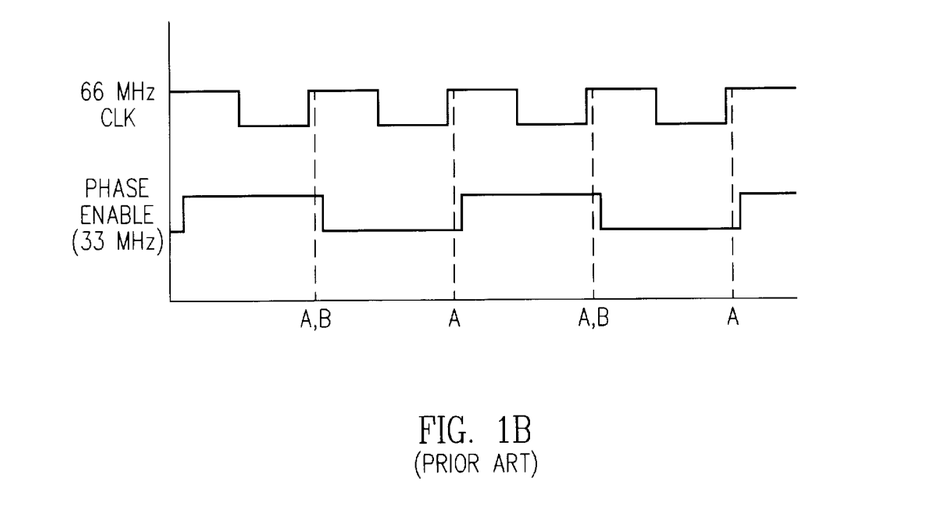
FIG. 1B is a waveform diagram illustrating the operation of circuit 100.

Another conventional method of clocking different functional units at different rates is known as the "phase-enable" method. FIG. 1A illustrates a circuit 100 that makes use of a phase-enable signal to provide different clock rates to a functional unit A and a functional unit B. FIG. 1B is a waveform diagram illustrating the operation of circuit 100.

FIG. 1A includes a 66 MHz clock generator 105 that provides a 66 MHz clock on line CLK to functional unit A, functional unit B, and phase-enable logic 110. In response to the 66 MHz clock on line CLK, phase-enable logic 110 produces a phase-enable signal on a line PHASE_EN to an enable node EN of unit B.

In the example of FIG. 1A, functional unit A is clocked on every rising edge of the 66 MHz clock on line CLK, as indicated by the letters "A" along the horizontal axis of the timing diagram of FIG. 1B. Functional unit B is also clocked on rising edges of the 66 MHz clock; however, in addition to a rising edge, unit B requires a logic one (e.g., 3.3 volts) on phase-enable line PHASE_EN before unit B is clocked. Thus, unit B is only clocked when a rising edge of the 66 MHz clock on line CLK is coincident with a logic one phase-enable signal on line PHASE_EN, as indicated by the letters "B" along the horizontal axis of the timing diagram of FIG. 1B. (Signals indicative of logic zeroes and logic ones, typically zero and 3.3 volts, respectively, are referred to herein as logic zeroes and logic ones for brevity.) Using the phase-enable method described above, even though a 66 MHz clock is provided to the clock inputs of both unit A and unit B, unit B is clocked at a 33 MHz rate. Of course, phase-enable logic 110 may be designed to provide a phase-enable signal more or less often to provide clocking frequencies of other than 33 MHz for unit B.

A problem associated with circuit 100 (and similar circuits) is that the phase of the phase-enable signal on line PHASE_EN is not predictable. Assume, for example, that unit B includes an output buffer that is used to transmit data over an external 33 MHz bus. In such a case, the phase enable signal generated by phase-enable logic 110 must be synchronized with the 33 MHz bus clock. Unfortunately, circuit 100 provides no assurance of synchronization between the phase enable signal and the bus clock. That is, the rising edge of the phase-enabled clock signal of unit B may not be coincident with the rising edge of the external 33 MHz clock. There is therefore a need for a phase-enable and clock-generation circuit that provides timing of the appropriate phase and frequency for functional units operating at different frequencies.

While units A and B may each interface with devices that operate at different frequencies, some applications require that units A and B operate at the same frequency. It is therefore desirable to provide a timing circuit that selectively allows units A and B to operate either at the same or at different frequencies. Such a timing circuit would preferably allow units A and B to communicate with one another at the same clock frequency even when units A and B are clocked at different frequencies. Conventional phase-enable timing circuits do not offer such flexibility. There is therefore a need for a phase-enable and clock-generation circuit that supports different operational modes in which the functional units may be clocked at either the same or different clock frequencies.

SUMMARY

The present invention is directed to a phase-enable and clock-mode detection circuit that operates in two modes. In the first mode, the phase-enable and clock-mode detection circuit provides timing of the appropriate phase and frequency to a pair of functional units operating at the same frequency; in the second mode, the circuit provides timing of the appropriate phase and frequency for functional units operating at different frequencies.

In accordance with the present invention, each of the pair of function blocks is provided with a common clock signal. In the first mode, the phase-enable generator uses the first clock signal and a second clock signal of a second frequency lower than the first frequency to develop a phase-enable signal. The phase-enable signal periodically disables a clock input terminal of the second function block so that the second function block is clocked at the second frequency.

The phase-enable and clock-mode detection circuit enters the second mode when the frequency of the second clock is set to zero (e.g., to a constant logic level). In the second mode, the clock input terminal of the second function block is constantly enabled so that each function block is clocked at the same frequency.

Decoding the relative frequencies of the first and second clocks to determine the operational mode advantageously eliminates the need for an additional input terminal and associated components otherwise needed to choose an operational mode. Moreover, the inventive phase-enable system minimizes clock skew by eliminating the need for additional logic in the clock distribution path.

The present invention thus satisfies the need for a circuit that supports different operational modes in which the functional units may be clocked at either the same or different clock frequencies. Also important, the present invention allows a user to select from among the different operational modes without requiring any additional input terminals.

BRIEF DESCRIPTION OF THE FIGURES

These and other features, aspects, and advantages of the present invention will become better understood with regard to the following description, appended claims, and accompanying figures, where:

DETAILED DESCRIPTION

Figure 2:
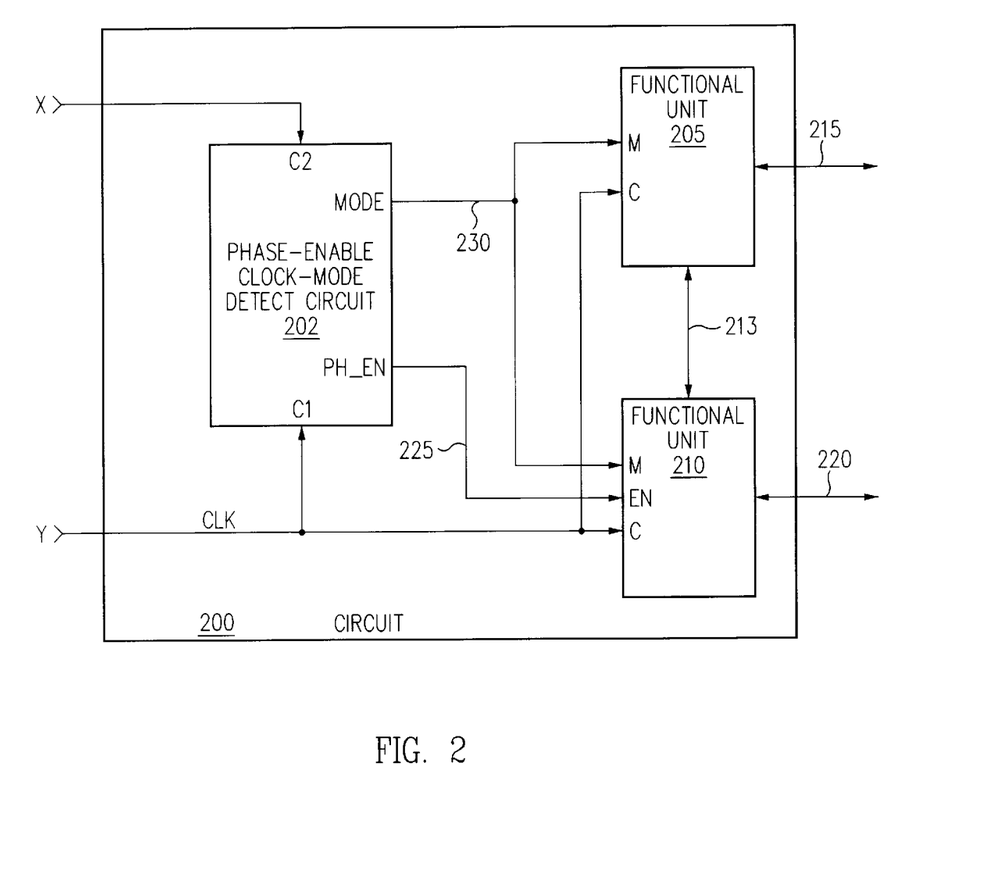
FIG. 2 is a block diagram of a circuit 200, including a phase-enable and clock-mode detection circuit 202 and conventional functional units 205 and 210.

FIG. 2 is a block diagram of a circuit 200, including a phase-enable and clock-mode detection circuit 202 and conventional functional units 205 and 210. Units 205 and 210 include conventional bus interface circuitry, and may be connected to one another via a bus 213 and to external devices (not shown) via first and second buses 215 and 220, respectively. In one embodiment, buses 215 and 220 are compliant with the Peripheral Component Interconnect (PCI) bus specification (the "PCI Specification"). The PCI Specification is available from the PCI Special Interest Group of Hillsboro, Oregon, and is incorporated herein by reference. For more PCI information, see Tom Shanley and Don Anderson "PCI System Architecture" (MindShare, Inc., 1994), also incorporated herein by reference.

In accordance with the present invention, circuit 200 may be configured to function in either of two operational modes. In the first mode, units 205 and 210 are each connected to external devices that operate at the same clock rate. For example, each of units 205 and 210 may be connected via buses 215 and 220 to external communications buses that operate at 33 MHz. In the second mode, units 205 and 210 are connected to external devices that operate at different clock rates. For example, unit 205 may be connected to a 66 MHz external communications bus via bus 215 and unit 210 may be connected to a 33 MHz external communications bus via bus 220. In either mode, units 205 and 210 can communicate with one another over a bus 213 at the same clock rate (e.g., 33 MHz in either of the preceding examples).

Because units 205 and 210 may be connected to external devices operating at different clock speeds, units 205 and 210 must also be capable of operating at different clock speeds. The first and second operational modes allow circuit 200 to do just that. By simply selecting appropriate input signals for input terminals X and Y, circuit 200 automatically configures units 205 and 210 to communicate at the appropriate respective frequencies.

Phase-enable and clock-mode-detection circuit 202 includes a first input terminal C1, a second input terminal C2, a phase-enable terminal PH_EN, and a mode-indication node MODE. Terminal C1 is connected to a first clock input terminal Y, a clock input node C of functional unit 205, and a clock input node C of functional unit 210 via a clock line CLK. Terminal C2 is connected to a second clock input terminal X.

In response to signals on first input terminal C1 and second input terminal C2, phase-enable and clock-mode detection circuit 202 provides both a phase-enable signal to unit 210 via a phase-enable line 225 and a mode-indication signal to unit 205 and unit 210 via a mode line 230.

Figure 3A:
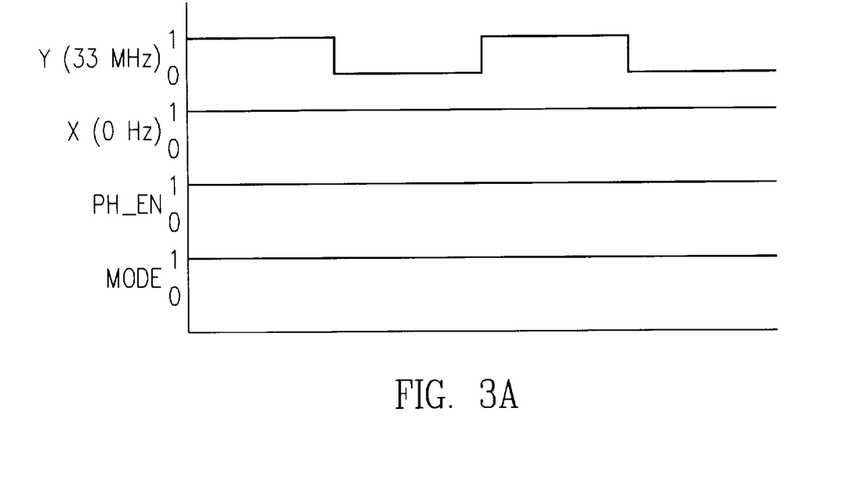
FIG. 3A depicts waveforms associated with circuit 200 in a first operational mode.

To place phase-enable and clock-mode detection circuit 202 in the first mode (the mode in which units 205 and 210 both operate at 33 MHz), input terminal X is coupled to a logic one (e.g., 3.3 volts) and input terminal Y is coupled to a 33 MHz clock. As shown in FIG. 3A, this configuration of input signals causes the phase enable signal (PH_EN) on line 225 and the clock mode signal (MODE) on line 230 to remain high (i.e., a logic one). The logic one on clock-mode line 230 indicates to functional units 205 and 210 that data is transmitted and received at 33 MHz. Note that the modes are decoded using only the clock input terminals. This advantageously eliminates the need for an additional input terminal and associated components otherwise needed to choose an operational mode.

The constant logic one on phase-enable line 225 provides a constant phase-enable to functional unit 210. Consequently, functional unit 210 is clocked by each rising edge of the 33 MHz clock on line CLK. Thus, in the first mode, both functional unit 205 and functional unit 210 are clocked on each rising edge of the 33 MHz clock signal.

Referring again to FIG. 3A, the aforementioned configuration of input signals causes the clock-mode signal (MODE) on line 230 to remain high. The purpose of the clock-mode signal is explained below in connection with FIGS. 4A, 4B, 5A, and 5B.

Phase-enable and clock-mode detection circuit 202 also supports a second operational mode, in which functional unit 205 is clocked at 66 MHz and functional unit 210 is clocked at 33 MHz. This mode is used, for example, when functional unit 205 is connected to a first external bus operating at 66 MHz and functional unit 210 is connected to a second external bus operating at 33 MHZ. Circuit 202 determines the appropriate operational mode by comparing the relative frequencies of the signals on terminals X and Y. This comparison advantageously allows phase-enable and clock-mode detection circuit 202 to use terminal X as a clock-mode select signal instead of requiring an additional input terminal and associated control logic.

Figure 3B:
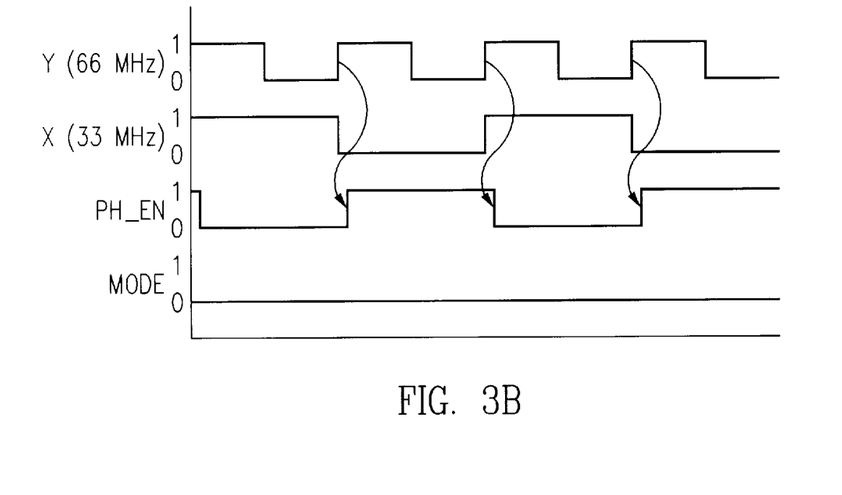
FIG. 3B depicts waveforms associated with circuit 200 in a second operational mode.

Circuit 202 enters the second operational mode when a 33 MHz external clock signal (e.g., the 33 MHz clock from the first external bus) is applied to terminal X and a 66 MHz external clock signal (e.g., the 66 MHz clock from the second external bus) is applied to terminal Y. This configuration is illustrated in FIG. 3B. In response to the 33 MHz and 66 MHz input signals, phase-enable and clock-mode detection circuit 202 outputs a 33 MHz phase-enable signal (PH_EN) on line 225 and a constant logic zero (e.g., zero volts) on clock-mode line 230.

In the second mode, unit 205 is clocked on every rising edge of the 66 MHz clock on line CLK. Unit 210 is also clocked on rising edges of the 66 MHz clock; however, in addition to a rising edge, unit 210 must be clock-enabled by a logic one on phase-enable line 225 before unit 210 is clocked. Thus, in the second mode unit 210 is clocked on every other rising edge of the 66 MHz clock on line CLK when the rising edge of the 66 MHz clock on line CLK is coincident with a clock-enabling logic one on PH_EN line 225. Furthermore, unit 210 is not merely clocked on every other rising edge of the 66 MHz clock, but is clocked only on those rising edges that are approximately coincident with the rising edges of the external 33 MHz clock. This is important, for it guarantees that functional unit 210 is clocked in phase with any external devices with which functional unit 210 is communicating.

The mode signal on line 230 indicates the mode (first or second) in which circuit 200 is operating. This information is important, as each of functional units 205 and 210 behaves differently depending upon the rate at which they are clocked. In a PCI-compliant embodiment for example, many operations are specified to occur over a specified number of PCI clock cycles. For example, generation of parity (conventional error checking) information is mandatory for all PCI devices that drive address or data information onto the address bus. The parity signal is driven one clock cycle after the address phase and the data phases of write transactions. In either mode, all of the sub-circuits (not shown) on circuit 200 are driven by the same clock signal CLK. Sub-circuits that are mode dependent include PCI master and target state machines and parity data paths.

In the first mode, each of units 205 and 210 are clocked at the same rate. Consequently, a one-clock-cycle delay is equal to the period of the clock signal CLK on terminal Y. However, in the second mode, because units 205 and 210 are interfacing with buses operating at different frequencies, the one-clock-cycle delay is different for unit 205 than for unit 210. For example, when unit 205 sends PCI compliant data out over bus 215 at 66 MHz and unit 210 sends PCI compliant data out over bus 220 at 33 MHz, the one-clock-cycle delay required for the parity signal on bus 215 is equal to the period of the 66 MHz clock on line CLK, whereas the one-clock-cycle delay required for the parity signal on bus 220 is equal to twice the period of the 66 MHz clock on line 205. The mode signal on line MODE is used to ensure that each device affected by the change in modes responds appropriately where a one-clock-cycle delay is required.

Figure 4A:
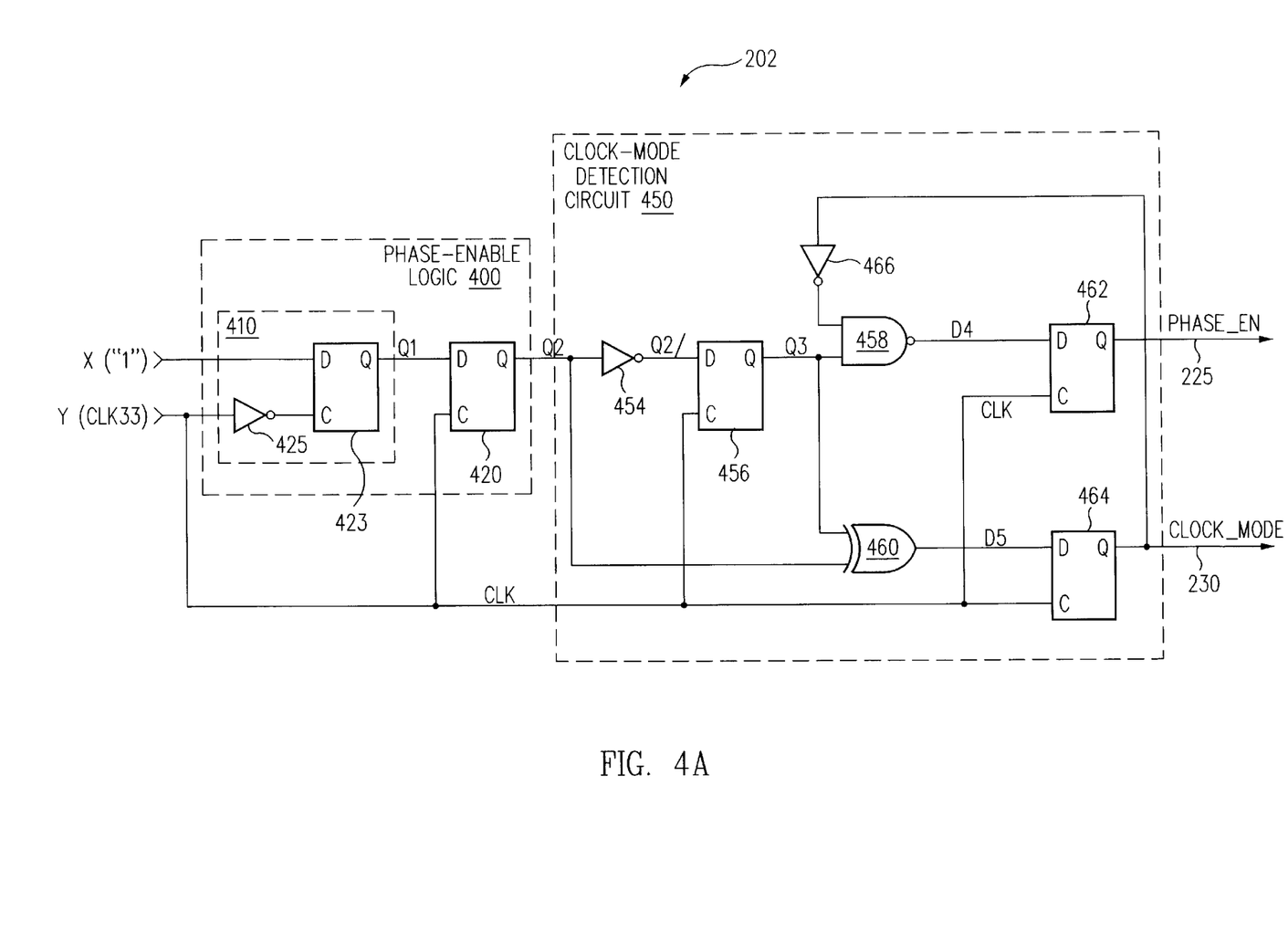
FIG. 4A is a schematic diagram of an embodiment of phase-enable and clock-mode generator circuit 202, which includes phase-enable logic 400 and a clock-mode detection circuit 450.

FIG. 4A is a schematic diagram of an embodiment of phase-enable and clock-mode generator circuit 202, including phase-enable logic 400 and clock-mode detection circuit 450. In FIG. 4A, circuit 202 is shown in the first mode, in which a logic one is applied to input terminal X and an externally supplied 33 MHz clock is applied to input terminal Y.

Phase-enable logic 400 includes a negative-edge-triggered flip flop 410 having an output terminal Q connected via a line Q1 to a data terminal D of a positive edge-triggered flip flop 420. Negative edge-triggered flip flop 410 is shown as a positive edge-triggered flip flop 423 having its clock input C coupled to line CLK via an inverter 425; however, a negative edge-triggered flip flop could be used as well. Flip flop 420 and the remaining flip flops of phase-enable and clock-mode detection circuit 202 are positive-edge-triggered flip flops having clock input terminals C connected to the 33 MHz clock via line CLK.

Figure 4B:
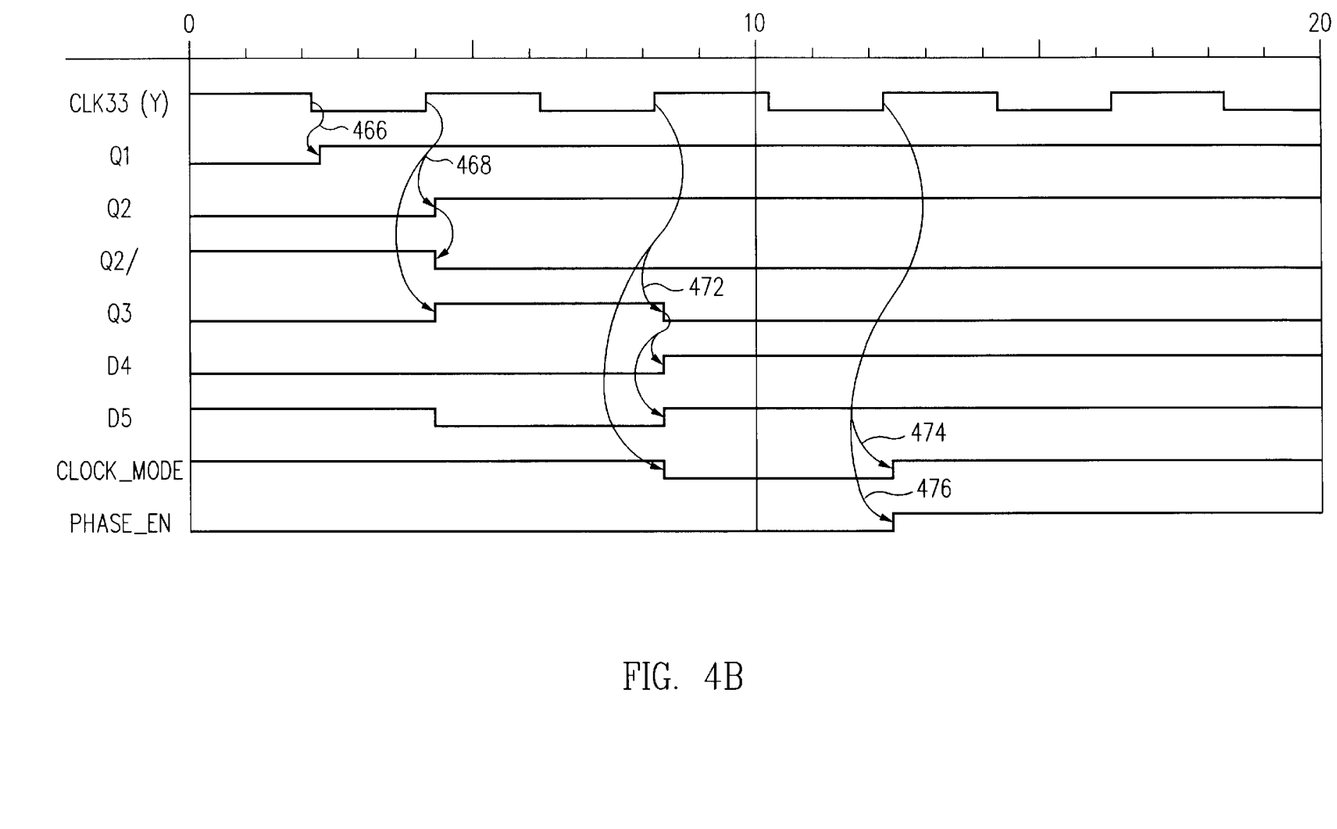
FIG. 4B is a timing diagram illustrating the operation of phase-enable and clock-generator circuit in the first operational mode.

FIG. 4B is a timing diagram illustrating the operation of circuit 202 in the first mode of operation. For illustrative purposes, each flip flop of circuit 202 is assumed initially reset (i.e., storing a logic zero).

In the first mode, data terminal D of flip flop 410 receives a constant logic one from input terminal X. Because flip flop 410 is negative-edge triggered, flip flop 410 outputs a logic one on line Q1 following the first negative edge (i.e., high-to-low transition) of the 33 MHz clock, as indicated by arrow 466 in FIG. 4B. The logic one is applied to data terminal D of flip flop 420, causing flip flop 420 to output a logic one following the next positive edge (i.e., low-to-high transition) of the 33 MHz clock (arrow 468).

The logic one on line Q2 is inverted by an inverter 454, resulting in a logic zero being provided to a data input D of a flip flop 456 via a line Q2/(arrow 470). Flip flop 456 consequently outputs a logic zero at the next positive edge of the 33 MHz clock (arrow 472) to a first input terminal of an AND gate 458 and to a first input terminal of an exclusive OR gate 460. After a few clock cycles, line Q2 provides a constant logic one to the second input terminal of exclusive OR gate 460 and line Q3 provides a constant logic zero to the first input terminal of exclusive OR gate 460. Consequently, exclusive OR gate 460 provides a constant logic one on line D5. A flip flop 464 outputs a logic one on clock mode line 230 at the next positive edge of the 33 MHz clock (arrow 474). Thus, the output on clock-mode line 230 remains a logic one when phase-enable and clock-mode detection circuit 202 is in the first operational mode. Clock-mode line 230 is connected through an inverter 466 to a second input of NAND gate 458. Hence, NAND gate 458 provides a constant logic one via a line D4 to a data input D of a flip flop 462. Finally, the constant logic one on line D4 is output on phase-enable line 225 at the next positive edge of the 33 MHz clock (arrow 476). Thus, as described above in connection with FIGS. 2 and 3A, both the phase-enable signal on line 225 and the clock-mode signal on line 230 remain high (constant logic ones) after a set-up time of a few clock cycles.

Figure 5A:
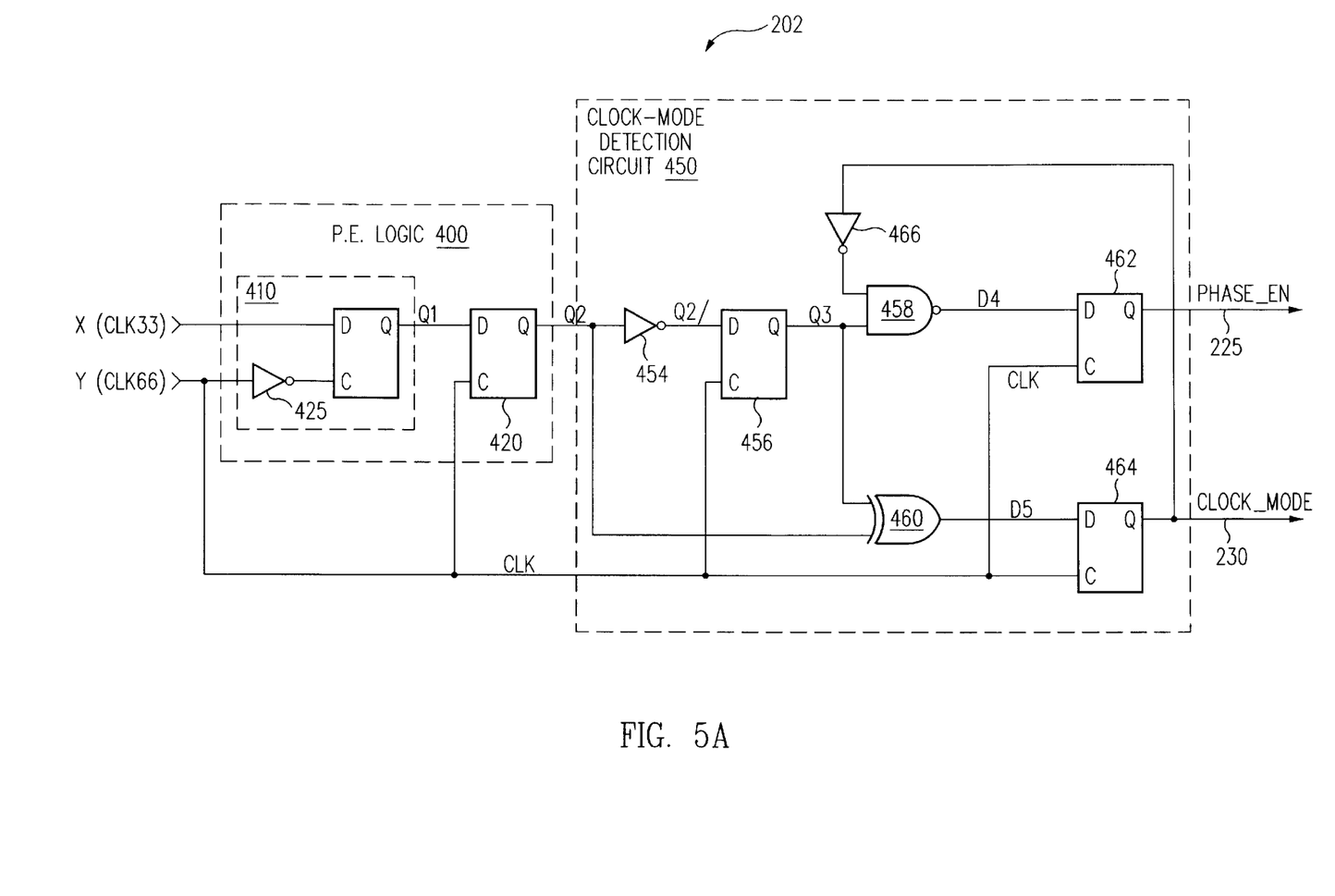
FIG. 5A is similar to FIG. 4A, but shows phase-enable and clock-mode generation circuit 202 in the second operational mode.

FIG. 5A is similar to FIG. 4A, but shows phase-enable and clock-mode generation circuit 202 in the second operational mode. Circuit 202 automatically enters the second mode when a 33 MHz clock is applied to input terminal X and a 66 MHz clock is applied to input terminal Y.

Figure 5B:
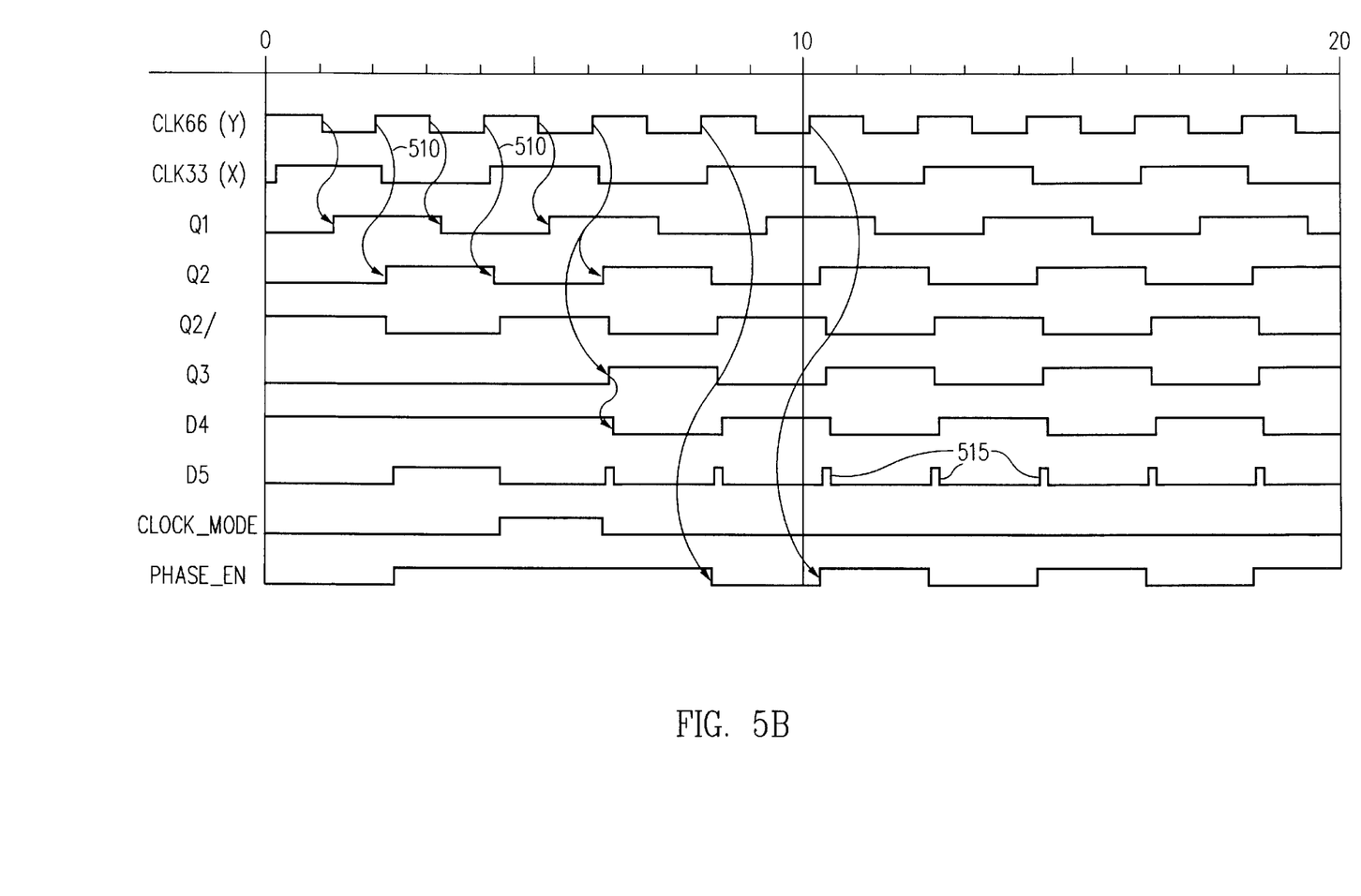
FIG. 5B is a timing diagram illustrating the operation of phase-enable and clock-generator circuit 202 in the second operational mode.

FIG. 5B is a timing diagram illustrating the operation of phase-enable and clock-generator circuit 202 in the second mode of operation. For illustrative purposes, each flip flop of phase-enable and clock-mode detection circuit 202 is assumed initially reset.

As shown in FIG. 5B, negative edge-triggered flip flop 410 combines the 33 and 66 MHz clock signals from input terminals X and Y, respectively, to provide a 33 MHz input signal on line Q1 to the data input of flip flop 420. Restated, the 33 MHz clock is sampled by the falling edges of the 66 MHz clock. The signal on line Q1 is clocked through to the output terminal Q of flip flop 420 on every positive edge of the 66 MHz clock. Were it not for the requirement of a clock mode signal indicative of whether phase-enable and clock-mode detection circuit 202 is in the first or second mode, the signal available on phase-enable terminal Q2 would be sufficient to provide a phase-enable signal for functional unit 210.

The signal on line Q2 is input to clock-mode detection circuit 450 along with the 66 MHz signal on line CLK. Clock-mode detection circuit 450 includes a phase-enable terminal coupled to the input of an inverter 454. Inverter 454 includes an output terminal connected to the data input of a flip flop 456. The output terminal Q of flip flop 456 is connected to one input of a NAND gate 458 via a line Q3, and to a first input of an exclusive OR gate 460. The second input of exclusive OR gate 460 is coupled to phase-enable terminal Q2. The output of NAND gate 458 is coupled to a flip flop 462 via a line D4, and the output of exclusive OR gate 460 is coupled to the data input of a flip flop 464 via a line D5. The phase-enable signal on output terminal Q of flip flop 462 is provided to functional unit 210 on phase enable line PHASE_EN as shown in FIG. 2. The output of flip flop 464 is provided as feedback through an inverter 466 to an input of NAND gate 458, and to each of functional units 205 and 210 via a clock mode line as shown in FIG. 2.

An inverted version of the phase-enable signal on terminal Q2 is applied to the data terminal D of flip flop 456, and is clocked through to the output Q of flip flop 456 by the 66

MHz clock signal on line CLK. As a result, flip flop 456 provides a slightly delayed version of the signal on line Q2 to both NAND gate 458 and exclusive OR gate 460 via line Q3. Exclusive OR gate 460 provides the exclusive OR function to the signal on line Q2 and the slightly delayed phase-enable signal on line Q3. The result of the exclusive OR is output on line D5 as a logic zero signal having periodic positive glitches (515), as shown in FIG. 5B. Because the signal on line D5 is always a logic zero during the positive edges of the 66 MHz clock on clock line CLK, flip flop 464 outputs a constant logic zero on the clock mode line 230.

In addition to providing the appropriate logic level on clock mode line 230, the logic zero on clock-mode line 230 from flip flop 464 is inverted by inverter 466 and applied to an input of NAND gate 458, thereby providing a constant logic one on one input of NAND gate 458. Thus configured, NAND gate 458 provides a logic zero on line D4 each time the slightly delayed phase-enable signal on line Q3 goes high. The signal on line D4 is transferred through flip flop 462 on the positive going edges of the 66 MHz clock on line CLK. The output Q of flip flop 462 is provided to functional unit 210 as the phase-enable signal on line 225. The phase-enable signal on line 225 operates as described above with respect to FIGS. 3A and 3B. Functional unit 210 is clocked on every second rising edge of the 66 MHz clock on line CLK. Also important, the edges of the 66 MHz clock that clock functional unit 210 are in phase with the external 33 MHz clock on terminal X. Thus, the combination of the 66 MHz clock on line CLK and the phase-enable signal on line 225 clock functional unit 210 at 33 MHz and in phase with the external 33 MHz clock.

The present invention is not limited to the above-described specific embodiments. For example, while the invention is described in connection with 66 and 33 MHz clocks and clock ratios of one-to-one or two-to-one, other frequencies and other ratios may be used. Moreover, some components are shown directly connected to one another while others are shown connected via intermediate components. In each instance the method of interconnection establishes some desired electrical communication between two or more circuit nodes. Such communication may often be accomplished using a number of circuit configurations, as will be understood by those of skill in the art. Accordingly, various adaptations, modifications and substitutions of various of the features of the specific embodiments described above can be practiced without departing from the scope invention as defined by the claims.

What is claimed is:

1. A phase-enable circuit for clocking a first functional unit at a first frequency and a second functional unit at a second frequency, wherein the first frequency is greater than the second frequency, the phase-enable circuit comprising:
   a first input terminal coupled to receive a binary first clock signal of the first frequency defined by a first number of predetermined periodic logic level transitions occurring per second
   a second input terminal coupled to receive a binary second clock signal of the second frequency defined by a second number of said predetermined periodic logic level transitions occurring per second wherein the second input terminal receives a non-periodic signal in a first mode of operation and the binary second clock signal in a second mode of operation;
   a phase-enable terminal;
   phase-enable logic connected to the first and second input terminals and coupled to said phase-enable terminal, wherein the phase-enable circuit generates a phase-enable signal of the second frequency on said phase-enable terminal, the phase-enable signal having said predetermined periodic logic level transitions occurring at the second frequency, wherein the predetermined periodic logic level transitions of the phase-enable signal are generated by said phase-enable circuit by using the binary second clock signal and the binary first clock signal; and
   a clock-mode detection circuit coupled to the phase-enable logic wherein said clock-mode detection circuit is coupled to said first and second input terminals by said phase-enable logic, and further wherein said clock-mode detection circuit generates a first clock-mode signal in the first mode of operation and a second clock-mode signal in the second mode of operation wherein said clock-mode detection circuit is coupled to said first and second input terminals by said phase-enable logic, and further wherein said clock-mode detection circuit generates a first clock-mode signal in the first mode of operation and a second clock-mode signal in the second mode of operation.

2. The phase-enable circuit of claim 1 wherein the phase-enable logic further comprises a negative-edge-triggered flip flop, wherein the first and second input terminals of the phase-enable circuit are a first clock terminal and a first data terminal, respectively, of the negative-edge-triggered flip flop.

3. The phase-enable circuit of claim 2 wherein the phase-enable logic further comprises a second flip flop having:
   a second data terminal connected to an output terminal of the negative-edge-triggered flip flop; and
   a second clock terminal connected to the first input terminal;
      wherein an output terminal of the phase-enable logic is an output node of the second flip flop.

4. The phase-enable circuit of claim 1 wherein said first clock-mode signal is a logic signal.

5. The phase-enable circuit of claim 1 wherein the first frequency is an integer multiple of the second frequency.

6. The phase-enable circuit of claim 5 wherein the integer multiple is two.

7. A phase-enable circuit comprising:
   phase enable logic comprising:
      a first input terminal coupled to receive a first clock signal of a first frequency, the first clock signal being defined by a first number of predetermined periodic logic level transitions occurring per second;
      a second input terminal coupled to receive a second clock signal of a second frequency wherein the second input terminal receives a non-periodic signal in a first mode of operation and the second clock signal in a second mode of operation;
   a phase-enable terminal coupled to said phase enable logic;
      wherein the phase-enable circuit receives the second clock signal and the first clock signal to generate on the phase-enable terminal a phase-enable signal of the second frequency and
   a clock-mode-detection circuit coupled to said phase enable logic configured to output a first clock-mode signal in the first mode of operation and a second clock-mode signal in the second mode of operation.

8. The circuit of claim 7, said phase enable logic further comprising a negative-edge-triggered flip flop having a data terminal and a clock terminal, wherein the first input terminal is coupled to said clock terminal and the second input terminal is connected to said data terminal.

9. The circuit of claim 8, said phase enable logic further comprising a second flip flop having:

a data terminal of the second flip flop connected to an output terminal of the negative-edge-triggered flip flop; and a clock terminal of the second flip flop connected to the first input terminal;

wherein an output terminal of the phase-enable logic is an output node of the second flip flop.

10. The phase-enable circuit of claim 7 wherein the first clock-mode signal is a logic signal.

11. A system comprising:

a clock terminal coupled to receive a clock signal;

a second terminal coupled to receive a clock mode-select signal;

a phase-enable and clock-mode detection circuit including:

a first detection circuit input terminal connected to the clock terminal;

a second detection circuit input terminal connected to the second terminal; and a phase-enable output terminal;

a first functional unit having a clock input node connected to the clock terminal; and a second functional unit having a clock input node connected to the clock terminal and a phase-enable input terminal connected to the phase-enable output terminal;

wherein the phase-enable and clock-mode detection circuit generates a phase-enable signal on the phase-enable output terminal.

12. The system of claim 11 wherein the phase-enable signal and the clock mode-select signal are of a same frequency.

13. The system of claim 12 wherein the frequency of the clock mode-select signal is zero.

14. The system of claim 11 wherein the phase-enable signal and the clock mode-select signal are periodic signals having periodic logic level transitions, and wherein the periodic logic level transitions of the phase-enable signal are generated by sampling the clock signal with the clock mode-select signal.

15. The system of claim 14 wherein a frequency of the clock mode-select signal is one-half a frequency of the clock signal.

16. The system of claim 11 wherein the clock mode-select signal is indicative of a first mode or a second mode.

17. The system of claim 16 wherein the clock mode-select signal is a constant voltage in the first mode and is a periodic signal in the second mode.

18. The system of claim 17 wherein a frequency of the periodic signal is one-half a frequency of the clock signal.

* * * * *